INVENTORS
Roscoe T. Earl and
Glenn E. Wehl
BY
Frease, Bishop, Johns & Schick
ATTORNEYS

United States Patent Office 3,232,209
Patented Feb. 1, 1966

3,232,209
APPARATUS FOR PREPARING MEAT
TENDERIZING SOLUTION
Roscoe T. Earl and Glenn E. Wehl, North Canton, Ohio, assignors to The Sugardale Provision Company, Canton, Ohio, a corporation of Ohio
Filed Feb. 13, 1964, Ser. No. 344,603
8 Claims. (Cl. 99—257)

This invention relates to a device for treatment of meat such as beef, mutton, lamb, veal, and pork. More particularly, it pertains to a semiautomatic device for preliminarily mixing and storing a preselected quantity of meat tenderizing solution and for injecting a quantity of the solution into a carcass equal to a prescribed percentage of the weight of a carcass. The invention also pertains to a device for injecting the solution in an evenly distributed manner throughout all or parts of a carcass at one time on a production-line basis.

Various procedures have been known for injecting treatment solutions into meat for enhancing flavor and obtaining a more edible product. It is known, for instance, that aqueous solutions of enzymes are acceptable for tenderizing meat. Where meat is injected with enzymes the procedure may be governed by requirements of regulatory agencies. The procedure in tenderizing beef involves a tenderizing solution of enzymes injected immediately after slaughter while the carcass is still within the body temperature range of 96° to 110° F. If an injection is made below that temperature range difficulties arise due to solidification of fat and rigor mortis.

Associated with the foregoing may be a requirement that a specific amount of enzyme solution be injected into the meat, namely, 1 to 3% of the weight of the carcass. If too much enzyme solution is used, the meat may have excess moisture. This may cause difficulties in cooking because the center of the cooked meat may be raw. Excess moisture also may separate the meat tissue. Moreover, excess enzymes may cause over-tenderization. On the other hand, if too little solution is used, no effective tenderization occurs when the meat is cooked. The enzyme solution should be distributed at body temperature preferably immediately after slaughter; and the enzyme solution becomes effective to accomplish tenderizing while the meat is being cooked, the enzyme being activated by the heat of cooking.

In addition, the tenderizing solution of enzymes must be injected into the meat tissue of the carcass under controlled and uniform pressure. If the pressure is not high enough, the solution will not penetrate the meat tissue properly. If the pressure is too great, however, the solution tears the meat tissue in the area surrounding the injection needles and deteriorates the quality of the meat, as well as minimizes the penetration and uniformity of distribution of the tenderizing solution. Under proper pressure and temperature conditions the tenderizing solution is injected into the meat tissue of the desired carcass portions in one operation.

Various types of apparatus have previously been used for injecting tenderizing solution into a carcass. Most of such apparatus have been unsatisfactory for various reasons. In the first place, no prior device has been provided for injecting a whole or half-carcass completely in one operation to obtain an even distribution of fluid through the meat tissue.

Some devices have involved the use of a manually operated syringe with a hypodermic-type needle which is injected into different locations in a carcass for repeated injections until a carcass is presumably completely penetrated. Such a procedure is unsatisfactory primarily because of the many number of injections which must be made in different locations in order to completely penetrate all of the meat tissue.

In addition, where the single needle is used with a hand-operated pump, it is readily apparent that varying pressures of injection for each injection are possible and, therefore, subject to the disadvantages set forth above, namely, different pressure for each injection resulting in many injections and excessive or insufficient pressure, thereby resulting in non-uniform penetration.

Other devices for treating meat have involved injection of tenderizing solution into the blood vessels of a carcass. Such procedure is unsatisfactory because the solution is carried through the arteries and veins without any control of the distribution of the enzyme solution in the proper or desired proportions or amounts throughout the carcass. When blood is used as a carrying agent, the enzyme solution is distributed in an unrestricted manner which may result in over-tenderization in certain meat tissue and not enough tenderization in other meat tissue. In accordance with the present concept apparatus is provided which in use can be controlled selectively to tenderize certain meat tissue that normally is tougher than other meat tissue.

Still other devices for tenderizing meat have involved the procedure of merely spraying or squirting tenderizing solution on meat surfaces. Here again there is no substantial penetration of the meat tissue and, therefore, no effective tenderizing of the meat.

Heretofore many prior devices and methods for tenderizing meat have been experimental. None have contemplated a meat tenderizing device by which it is possible to inject a solution into the meat tissue of an entire carcass at one time on a production-line basis. None of the prior known devices or methods have provided for the complete injection of the meat tissue of one carcass in one operation.

It has been found that the device of the present invention provides means for injecting tenderizing fluid in even distribution of the meat tissue throughout an entire carcass in one operation. The device also provides suitable means for preliminarily mixing a preselected quantity of solution to be injected and for storing the fluid in a pressurized system, suitably controlled for uniform penetration into the meat tissue of a carcass without pressure surges and pulses.

Accordingly, it is a general object of this invention to provide apparatus for preparing meat tenderizing solution for injection on a semiautomatic basis into a whole carcass immediately after slaughter under production-line conditions.

It is another object of this invention to provide apparatus for preparing meat tenderizing solution for injection of a preset quantity of solution into the meat tissue of the carcass under production-line conditions.

It is another object of this invention to provide apparatus for preparing meat tenderizing solution for use in injecting the proper amount in proportion to the weight of the carcass.

It is another object of this invention to provide apparatus by which enzyme concentrate may be mixed automatically in desired proportion with an aqueous solution to provide an enzyme mixture ready for carcass injection.

It is another object of this invention to provide apparatus for preparing meat tenderizing solution which incorporates a counting and metering control system by which an operator can manually preselect the correct quantity of fluid to be injected by setting a pointer on the metering dial.

It is another object of this invention to provide apparatus for preparing meat tenderizing solution by which a preselected quantity of solution can be injected into an entire carcass in an evenly distributed manner.

It is another object of this invention to provide apparatus for preparing meat tenderizing solution by providing a reservoir for preliminarily storing a tenderizing concentrate solution, for controlled mixing of the concentrate with water, and for storing an aqueous mixture ready for use in a pressurized system.

It is another object of this invention to provide an apparatus for preparing meat tenderizing solution for uniform penetration of the tenderizing fluid into the meat tissue with even or uniform pressure throughout the carcass.

Finally, it is an object of this invention to provide an improved apparatus for preparing meat tenderizing solution which substantially eliminates the difficulties enumerated and attains the foregoing desiderata in an effective manner.

These and other objects and advantages apparent to those skilled in the art from the following description and claims may be obtained, the stated results achieved, and the described difficulties and problems overcome and solved by the parts, elements, constructions, mechanisms, combinations, subcombinations and arrangements, which comprise the present invention, the nature of which is set forth in the following general statement, a preferred embodiment of which—illustrative of the best mode in which applicants have contemplated applying the principles—is set forth in the following description and shown in the drawings, and which are particularly and distinctly pointed out and set forth in the appended claims forming part hereof.

The nature of the discoveries and improvements of the present invention may be stated in general terms as including apparatus for tenderizing meat having a concentrate-solution storage tank, an aqueous-concentrate-mixture pressurized storage tank, a plurality of solution-injection needles for insertion into the meat tissue of a carcass, a pipeline interconnecting the storage tanks and the needles, a source of water supply connected to the pipeline, a flow meter in the pipeline between the storage tanks, calibrated metering pump means in the line between the concentrate-solution tank and the flow meter, the flow meter and the calibrated metering pump means being interconnected for electrically counting and accumulating units of a mixture of water and concentrate solution passing through the meter, the pressurized storage tank having air-pressure means connected thereto, means for measuring the flow of a mixed solution from the pressurized storage tank to the needles in the pipeline, the means for measuring the flow of mixed solution including a second flow meter and means for counting and accumulating electric impulses generated by the flow meter in response to the flow of units of mixed solution, a solenoid shut-off valve in the pipeline between the flow meter and the needles, and the solenoid valve being electrically connected to the means for counting and accumulating, whereby the solenoid valve checks the flow of solution to the needles when the counter and accumulator means measure the preselected total of units passing through the flow meter.

Figure 1:
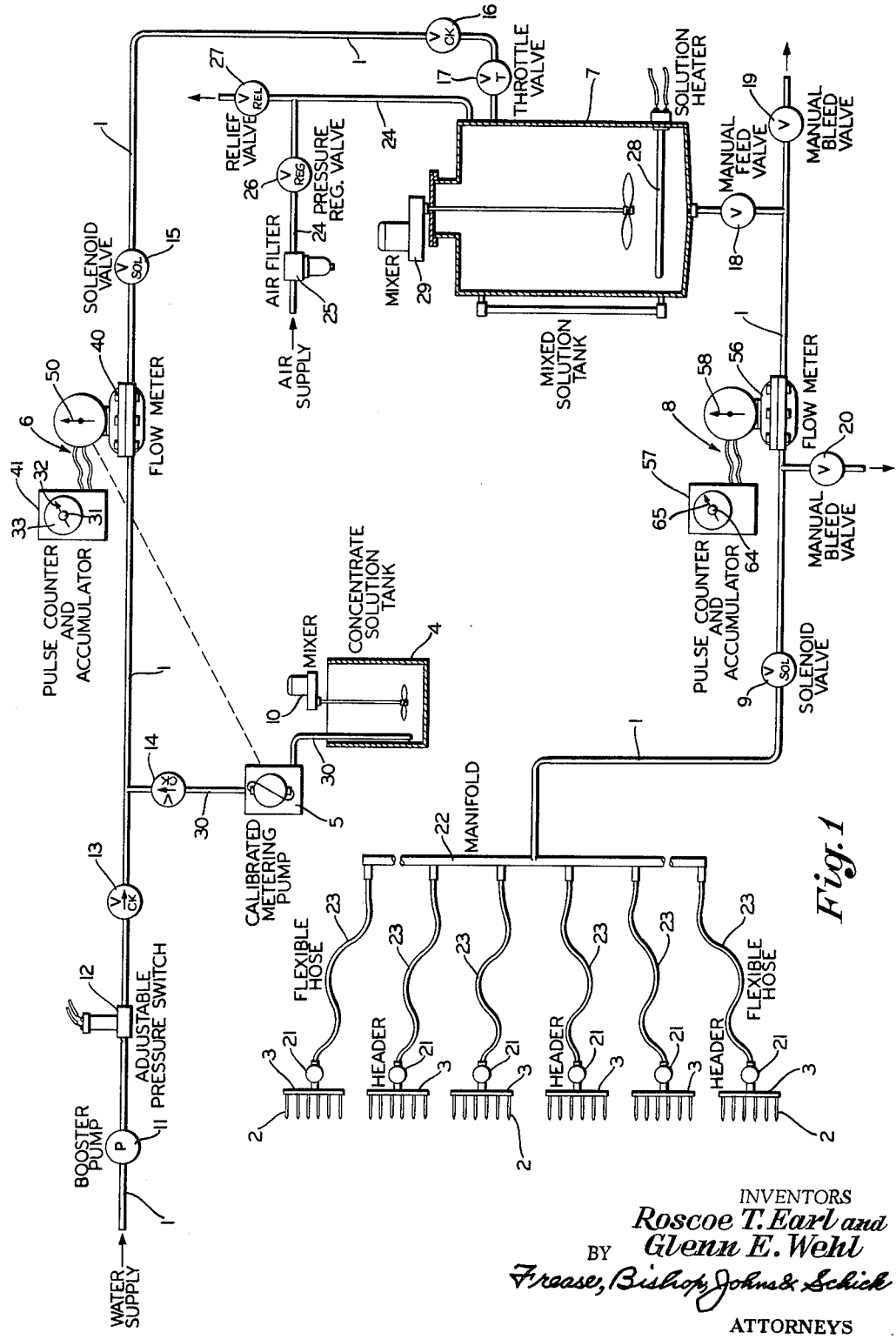
FIGURE 1 is a schematic flow sheet showing the elements included in the apparatus.

Although a beef carcass is shown in the drawings and described by way of example, it is understood that other types of meat are included such as mutton, lamb, pork, and veal.

The apparatus for injecting tenderizing solution into meat is shown in FIG. 1. It includes a pipeline 1 leading from a source of water supply to a plurality of gangs of injection needles 2 by which tenderizing solution is injected into the meat tissue of a carcass. The needles 2 are injection-type needles and have varying lengths from 4 to 7 inches. Each needle has a series of longitudinally spaced openings. The needles are preferably grouped in gangs of six needles and are inserted at specific locations and angles into the flesh or meat tissue of a freshly slaughtered carcass (such as beef) so that the extremities of the needles are properly located for even distribution and complete penetration of the muscles by the tenderizing solution.

In addition to the pipeline 1, the needles 2, and the headers 3 the device includes other elements for mixing the tenderizing elements with water and for storing the same under pressure for use as needed. The device also includes a solution concentration tank 4, a calibrated metering pump 5, flow meter means 6, a mixed solution tank 7, second flow meter means 8, and an electrically operated valve such as a solenoid valve 9.

The purpose of the elements connected to the pipeline 1 ahead of the mixed solution tank 7 is to mix the proper amount of meat tenderizer with water so that a mixed solution can be stored in the tank 7 for use as required. Accordingly, a concentrated mixture of meat tenderizing solution is mixed and stored in the tank 4 where it is stirred by a mixer 10.

The meat tenderizing concentrate solution is preferably composed of a powdered enzyme papain or vegetable pepsin taken from green papaya fruit of the leaves of the carica papaya. Papain aids digestion and is a proteolytic enzyme intermediate in action between pepsin and trypsin. The use of papain as a proteolytic enzyme and/or other compounds is well known in the art and is described in Patents Nos. 2,805,163, 2,852,391, 2,961,321, 2,999,020, 3,006,788 and 3,056,680.

The apparatus also includes a booster pump 11, an adjustable pressure switch 12, check valves 13 and 14, a solenoid valve 15, a check valve 16, and a throttle valve 17, all of which are located in the pipeline 1 for controlling the amounts of fluid leading to the mixed solution tank 7. In addition, the apparatus includes a feed valve 18, air bleed valves 19 and 20, and a check valve 21 at each header 3. A manifold 22 distributes solution from the end of the hose 1 to a plurality of flexible hoses 23 that lead to separate headers 3 for each gang of the needles 2.

The tank 7 is pressurized by air so that a source of air preferably under a pressure of 50 p.s.i. is supplied through a pipeline 24 into the upper end portion of the closed tank 7. The pipeline 24 includes an air filter 25, a pressure regulator valve 26, and a pressure relief valve 27. The tank 7 is provided with an electric heating coil 28 as well as a solution mixer 29.

The coil 28 includes a thermostat 28a extending into the tank 7 and through the tank wall. The thermostat 28a is preset for holding the solution temperature at the body temperaure of a carcass, namely 96°–110° F. The coil heating unit including a built-in thermostat is provided by the Wickerson Corporation of Englewood, Colorado, and is sold under the trademark "Chromalox."

A coil switch 28b is provided in the circuit of the coil 28 and external of the tank 7 for turning the coil on and off.

As shown in FIG. 1, the water used for mixing the solution enters the pipeline 1 and passes through the pressure booster pump 11 which applies a pressure equal to or greater than the pressure within the tank 7. The line pressure is maintained by the adjustable pressure switch 12 and the one-way check valves 13 and 14 prevent the solution from backing up into the line when the pump 11 is not working. More particularly, the check valve 14 prevents the solution from backing into the calibrated metering pump 5 in a pipeline 30 which extends into the tank 4 to the pipeline 1.

Figure 2:
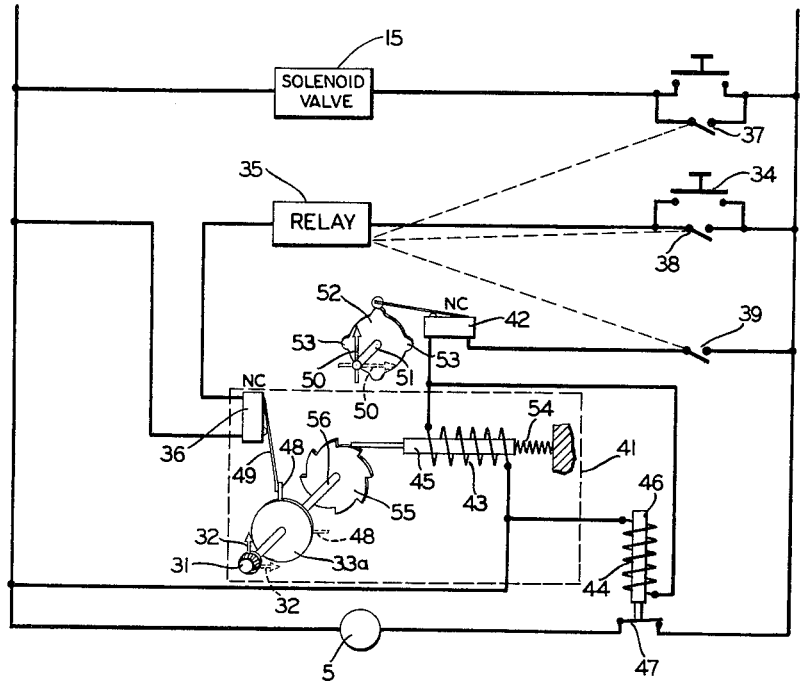
FIG. 2 is a diagrammatic view, partly in perspective, illustrating the metering and control means for injecting concentrate solution into the water pipeline.

The tank 7 is sufficiently large to store small or large quantities of mixed solution depending upon the requirements for a given work period. When the supply or batch of mixed solution in the tank is nearly depleted a fresh supply may be provided simply by turning a knob 31 (FIGS. 1 and 2) and an associated dial pointer 32 to a figure on a dial 33 indicating the desired number of gallons of aqueous concentrate solution to be provided in the tank 7. The operator then actuates a pump switch 34 (FIG. 2) which closes a circuit through a relay 35 and a normally closed microswitch 36, and the relay closes the normally open contacts 37, 38, and 39. Thus, the circuits through the solenoid valve 15 and a flow meter 40 are closed. In addition to the flow meter 40, the flow meter means 6 includes a pulse counter and accumulator 41 which includes the above-mentioned elements 31, 32, 33, and 36 (FIG. 2).

When the contacts 39 are closed by the relay 35, the circuit is closed through a normally closed microswitch 42 and solenoid coils 43 and 44. The coil 43 holds a solenoid core 45 retracted. The coil 44 holds the core 46 on a switch 47 for closing the circuit through the pump 5. When the circuit is subsequently opened through the coils 43 and 44, the core 45 moves to the left and the core 46 rises to open the switch 47.

When the dial pointer 32 is turned to any desired position a projection 48 on the periphery of a cam 33a is turned away from the home position against an arm 49 on the normally closed microswitch 36. Turning the dial pointer 32 actuates the manually settable counter and accumulator 41 which is calibrated to provide a fixed percentage of concentrated solution into a given quantity of water in the pipeline 1, which percentage is dependent upon the total weight of the beef carcass.

For example, the flow meter 40, being of the positive-displacement type, which is commercially available, is calibrated so that one full revolution of a dial pointer 50 is equal to one pint of liquid passing through the meter. The pointer 50 is mounted on a shaft 51 (FIG. 2) within the meter. A cam 52, having equally spaced cam projections 53, is also mounted on the shaft 51. When the shaft rotates in response to movement of liquid through the meter, each quarter revolution of the cam causes one projection 53 to operate the roller-type microswitch 42. Each time the switch 42 is actuated it opens the circuit through the coils 43 and 44 whereby a spring 54 thrusts the core 45 against a ratchet 55 on a shaft 56 on which the cam 33a, the dial pointer 32, and the knob 30 are mounted. Each time the ratchet 55 is operated it advances the projection 48 nearer to the home (vertical) position at which point it contacts the arm 49 of the normally closed microswitch 36 and opens the circuit through the relay 35, whereupon the process of replenishing the supply of solution in the tank 7 is completed. In the foregoing example, it is preferred that a pint of concentrate solution in the tank 4 be mixed with each five gallons of water passing through the flow meter 40 to provide a resulting tenderizing solution having 2.5% enzyme concentrate.

Each time the core 45 actuates ratchet 55, the core 46 in the wall coil 44 opens the switch 47 causing a piston in the commercially available pump 5 to return to its normal position ready for another complete stroke.

Figure 4:
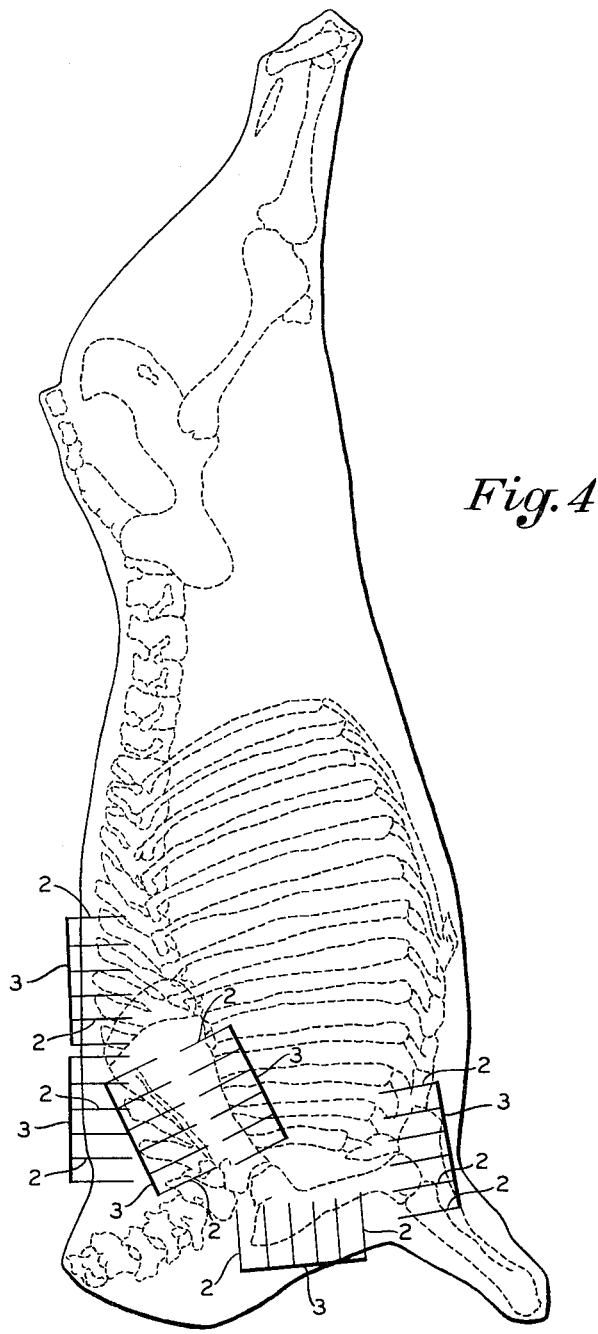
FIG. 4 is an elevational view of a side of a beef carcass showing the position of enzyme injection needles in the carcass.

To inject the tenderizing solution into a carcass, the several gangs or headers 3 of needles 2 are inserted into the meat tissue of a carcass at the desired locations such as shown diagrammatically in FIG. 4. The second flow meter means 8 includes a second flow meter 56 (FIG. 1) and a pulse counter and accumulator 57 (FIG. 1) which correspond to the flow meter 40 and accumulator 41. Thus, the flow meter 56 includes a dial with a pointer 58 mounted on a shaft 59 on which a cam 60 is also mounted. The cam is provided with equally spaced cam projections 61 which act upon a roller-type, normally closed microswitch 62. The meter also includes a pair of normally open contacts 63.

Likewise, the pulse counter and accumulator 57 includes a manual setting knob 64, a dial pointer 65, a cam 66, and a ratchet 67, all of which are mounted on a shaft 68. The cam includes a projection 69 which in its home position opens a normally closed microswitch 70. The accumulator 57 also includes a solenoid coil 71 having a core 72 which upon each opening of the circuit through the coil is thrust by a spring 73 against one tooth of the ratchet 67.

After the needles 2 are inserted in place in a carcass the dial pointer 65 is turned to a number on the dial corresponding to the weight of the carcass to be injected. For example, if the carcass weighs 200 pounds the dial pointer 65 is turned to a corresponding number 200 on the dial whereby the projection 69 is moved away from the switch 70. The operator then presses a switch 74 which closes the circuit through a relay 75 which closes normally open contacts 76, 77, and 63. The pressure within the tank 7 forces the solution out of the tank, through the meter 56, and the solenoid valve 9, and through the needles 2 into the carcass.

Figure 3:
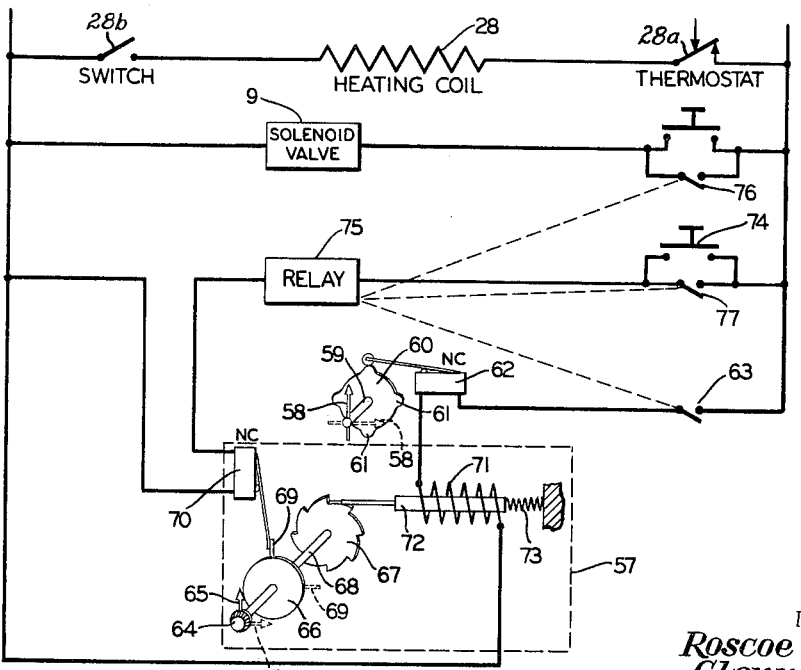
FIG. 3 is a diagrammatic view, partly in perspective, illustrating the metering and control means for measuring a preselected volume of tenderizing fluid being injected into a carcass.

During the flow, the meter 56 registers the flow of 80 fluid ounces of tenderizing solution which is equal to approximately five pounds, which represents 2.5% by weight of a 200 pound carcass. The cam 60 in the meter rotates in response to the flow of the solution through the meter. As the cam rotates the cam projections 61 open the normally closed microswitch 62 which opens the circuit through the coil 71 causing the core 72 to turn the ratchet 67 until the projection 69 moves to its home position against the arm of the switch 70. Thus, the circuit through the relay 75 is opened as well as the contacts 63, 76, and 77. As shown in FIG. 3, when the contact 76 is opened the solenoid valve 9 is closed.

The improved device of the present invention thus operates quickly and accurately to provide and maintain a constant supply of tenderizing solution for injection into meat. There is no problem involved in mixing additional quantities of solution where a preliminary estimate of solution later proves to be inaccurate, because any desired amount may be prepared in a minimum of time. There is no "down time" for the device.

In addition to the foregoing advantages the device permits injection of a tenderizing solution on a semi-automatic basis into a whole carcass immediately after slaughter and under production-line conditions and in accordance with requirements of law enforcement agencies in proportion to the weight of the carcass. A preselected quantity of solution can be injected into an entire carcass in an evenly distributed manner in one injection operation.

In the foregoing description an entire or whole carcass has been referred to; however, it is understood that a lesser portion of an entire carcass may be injected such as specific muscles in a front quarter, hind quarter, or side of beef. Moreover, the device may be used for injecting solutions for purposes other than tenderizing, such as flavoring or coloring. Furthermore, the solution base may be composed of a substance other than water. In some instances of treating meat, such as for tenderizing, flavoring, or coloring, the solution base may be oil instead of water in order to add flavoring, color additives, or color enhancers.

Finally, the device of the present invention avoids prior art difficulties involving the preparation of meat tenderizing solution and involving the injection of such solution uniformly into a complete carcass on a production-line basis, and overcomes the difficulties inherent in the prior art.

The improved equipment for the preparation and gang injection meat tenderizing solution may be advantageously used to carry out the method of treating meat carcasses described in the copending application of Roscoe T. Earl and Robert C. Hessman, filed March 20, 1964, Serial No. 353,443; and may also be used to treat meat carcasses in accordance with other desired procedures.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous, new and useful results obtained thereby, the new and useful construction, and reasonable mechanical equivalents thereof obvious to those skilled in the art, are set forth in the appended claims.

What is claimed is:

1. Apparatus for automatically preparing, storing, and dispensing a meat treatment solution for injection into meat tissue on a production-line basis, including a first storage tank for concentrated solution of meat treatment material, a second pressurized storage tank for a diluted mixture of said material, a plurality of diluted mixture injection needles independently insertable into the meat tissue of a carcass, conduit means interconnecting the storage tanks and the needles, a source of supply of meat treatment material solvent connected to the conduit means ahead of the first tank, a first flow meter connected with the conduit means between the first and second tanks, metering pump means connected to the conduit means between the first tank and the first flow meter for meter-pumping into a preset quantity of solvent flowing through the first flow meter a fixed percentage of concentrated solution to provide units of diluted mixture, the first flow meter including means initiating an electric pulse in response to the flow of each unit of diluted mixture, adjustable pulse counter and accumulator means connected with the first flow meter, means for controlling operation of the pump means responsive to a predetermined condition of adjustment of said pulse counter and accumulator means; second flow meter means connected with the conduit means between the second tank and the needles for accumulating counts of units of diluted mixture flowing from the second pressurized tank to the needles, said second flow meter means including manually settable means measuring the flow of a preset number of units of diluted mixture, and a shut-off valve in the conduit means between the second flow meter means and the needles connected to the manually settable means and responsive to a predetermined setting of said settable means to close said shut-off valve.

2. Apparatus for automatically preparing, storing, and dispensing a meat treatment solution for injection into meat tissue on a production-line basis, including a first storage tank for concentrated solution of meat treatment material, a second pressurized storage tank for a diluted mixture of said material, a plurality of diluted mixture injection needles independently insertable into the meat tissue of a carcass, conduit means interconnecting the storage tanks and the needles, a source of supply of meat treatment material solvent connected to the conduit means ahead of the first tank, a first flow meter connected to the conduit means between the first and second tanks, metering pump means connected to the conduit between the first tank and the first flow meter for meter-pumping into a preset quantity of solvent flowing through the first flow meter a fixed percentage of concentrated solution to provide units of diluted mixture, the first flow meter including a rotatable cam and cam-actuated switch means initiating an electric pulse in response to the flow of each unit of diluted mixture through said first meter, pulse counter and accumulator means connected with the first flow meter for accumulating pulses from the cam-actuated switch means, manually settable means for presetting and accumulating a preset number of pulses from the cam-actuated switch means, switch means connected with the pump means and actuated by said pulse counter and accumulator means for controlling operation of the pump means responsive to the condition of setting of said manually settable means, a shut-off valve in the conduit means between the first flow meter and the second tank actuated by the control of the metering pump means to close the flow of diluted mixture when a preset number of units of diluted mixture pass through the first flow meter; second flow meter means connected with the conduit means between the second tank and the needles for accumulating counts of units of diluted mixture flowing from the second pressurized tank to the needles, said second flow meter means including manually adjustable means measuring the flow of a preset number of units of diluted mixture, said second flow meter means also including a second switch, a shut-off solenoid-operated valve in the conduit means between the second flow meter means and the needles, and said second switch being connected with the solenoid-operated shut-off valve and said manually adjustable means to close the shut-off valve when a preset number of units of diluted mixture has passed through said second flow meter means.

3. Apparatus for automatically preparing, storing, and dispensing a meat treatment solution for injection into meat tissue on a production-line basis, including a first storage tank for concentrated solution of meat treatment material, a second pressurized storage tank for a diluted mixture of said material, a plurality of diluted mixture injection needles independently insertable into the meat tissue of a carcass, conduit means interconnecting the storage tanks and the needles, a source of supply of meat treatment material solvent connected to the conduit means ahead of the first tank, first flow meter means in the conduit means between the first and second tanks, metering pump means connected to the conduit means between the first tank and the first flow meter for meter-pumping into a preset quantity of solvent flowing through the first flow meter a fixed percentage of concentrated solution to provide units of diluted mixture, means for controlling operation of the pump means responsive to a predetermined amount of flow through said first flow meter; second flow meter means in the conduit means between the second tank and the needles, the second flow meter means including means initiating an electric pulse in response to the flow of each unit of diluted mixture, pulse counter and accumulator means connected with the second flow meter means for accumulating counts of units of diluted mixture flowing from the second pressurized tank to the needles, said pulse counter means being manually settable to measure the flow of a preset number of units of diluted mixture, and a shut-off valve in the conduit between the second flow meter and the needles connected to the pulse counter means and responsive to the flow of a predetermined number of units of diluted mixture to close the valve.

4. Apparatus for automatically preparing, storing, and dispensing a meat treatment solution for injection into meat tissure on a production-line basis, including a first storage tank for concentrated solution of meat treatment material, a second pressurized storage tank for a diluted mixture of said material, a plurality of diluted mixture injection needles independently insertable into the meat tissue of a carcass, conduit means interconnecting the storage tanks and the needles, a source of supply of meat treatment material solvent connected to the conduit means ahead of the first tank, first flow meter means in the conduit means between the first and second tanks, metering pump means connected to the conduit means between the first tank and the first flow meter for meter-pumping into a preset quantity of solvent flowing through the first flow meter a fixed percentage of concentrated solution to provide units of diluted mixture, means for controlling operation of the pump means responsive to a predetermined amount of the flow through said first flow meter; second flow meter means in the conduit between the second tank and the needles, the second flow meter means including a rotatable can and cam-actuated switch means initiating an electric pulse in response to the flow of each unit of diluted mixture through said second flow meter means, pluse counter and accumulator means connected with the second flow meter means for accumulating pulses from the cam-actuated switch means to accumulate counts of units of diluted mixture, flowing from the second pressurized tank to the needles, said second flow meter means being manually settable to measure the flow of a preset number of units of diluted mixture of said solution, a shut-off valve in the conduit means between the second flow meter means and the needles, switch means connected with the shut-off valve and actuated by said pulse counter and accumulator means responsive to the flow of a predetermined number of units of diluted mixture to close the valve, and said pulse counter and accumulator means having a switch responsive to the cam-actuated switch for closing a circuit through the shut-off valve when the preset number of units of solution pass through the second flow meter means.

5. Apparatus for automatically preparing, storing and dispensing meat treatment solution for injection into meat tissue on a production-line basis, including a first storage tank for concentrated solution of meat treatment material, a second pressurized storage tank for diluted mixture of said material, a plurality of diluted mixture injection needles independently insertable into the meat tissue of a carcass, conduit means interconnecting the storage tanks and the needles, a source of supply of meat treatment material solvent connected to the conduit ahead of the first tank, a first flow meter in the conduit between the first and second tanks and having a rotatable cam responsive to the flow of each unit of diluted mixture, the first flow meter having a cam-actuated switch for initiating an electric pulse in response to the flow of each unit of diluted mixture through the meter, a first manually settable pulse counter for accumulating a preset number of electric pulses, a metering pump in the conduit between the first tank and the first flow meter for measuring the flow of a fixed percentage of concentrated solution for a preset quantity of solvent flowing through the first meter, means controlling operation of the pump in response to the accumulation of a preset number of electric pulses; second flow meter means in the conduit between the second tank and the injection needles and having a rotatable cam responsive to the flow of each unit of a diluted mixture from the second pressurized tank, the second flow meter having a cam-actuated switch for initiating an electric pulse to the second counter in response to the flow of each unit of diluted mixture through the second meter, a second manually settable pulse counter for accumulating a preset number of electric pulses from the second flow meter, and a solenoid shut-off valve in the conduit between the second storage tank and the needles controlled by the second pulse counter for closing the conduit when the preset number of units of diluted mixture flow through the second flow meter.

6. Apparatus for automatically preparing, storing, and dispensing a meat treatment solution for injection into meat tissue on a production-line basis, including a first storage tank for concentrated solution of meat treatment material, a second pressurized storage tank for a diluted mixture of said material, injection means for separate insertion into various portions of the meat tissue of a carcass, conduit means interconnecting the storage tanks and the injection means, a source of supply of meat treatment material solvent connected to the conduit means between the first and second tanks, a first flow meter connected to the conduit means between the first and second tanks, metering pump means connected to the conduit means between the first tank and the source of meat treatment material solvent for meter-pumping into a preset quantity of solvent flowing through the first flow meter a fixed percentage of concentrated solution to provide units of diluted mixture, means connected between the first flow meter and the metering pump means for controlling operation of the pump in response to operation of the first flow meter, adjustable means connected to the first flow meter for counting the units of diluted mixture flowing through the first flow meter and for stopping operation of the pump when a predetermined number of units flows through the meter; second accumulator-flow meter means connected with the conduit means between the second tank and the injection means for accumulating counts of units of diluted mixture flowing from the second pressurized tank to the injection means, said second flow meter means including manually settable means measuring the flow of a preset number of units of diluted mixture, and a shut-off valve in the conduit means between the second flow meter means and the injection means connected to the manually settable means and responsive to a predetermined setting of said settable means to close said shut-off valve.

7. Apparatus for automatically preparing, storing, and dispensing a meat treatment solution for injection into meat tissue on a production-line basis, including a first storage tank for concentrated solution of meat treatment material, a second pressurized storage tank for a diluted mixture of said material, a plurality of solution injection needles independently insertable into the meat tissue of a carcass, conduit means interconnecting the storage tanks and the needles, a source of supply of meat treatment material solvent connected to the conduit means ahead of the first tank, a first flow meter connected with the conduit means between the first and second tanks, metering pump means connected with the conduit means between the first tank and the first flow meter for meter-pumping into a preset quantity of solvent flowing through the first flow meter a fixed percentage of concentrated solution to provide units of diluted mixture, adjustable counter and accumulator means connected with the first flow meter for counting units of diluted mixture flowing through the first flow meter, means for controlling operation of the pump means responsive to a predetermined condition of adjustment of said counter and accumulator means; second flow meter means connected with the conduit means between the second tank and the needles for accumulating counts of units of diluted mixture flowing from the second pressurized tank to the needles, said second flow meter means including manually settable means measuring the flow of a preset number of units of diluted mixture, and a shut-off valve in the conduit means between the second flow meter means and the needles connected to the manually settable means and responsive to a predetermined setting of said settable means to close said shut-off valve.

8. Apparatus for automatically preparing, storing, and dispensing a meat treatment solution for injection into meat tissue on a production-line basis, including a first storage tank for concentrated solution of meat treatment material, a second pressurized storage tank for a diluted mixture of said material, a plurality of solution injection needles independently insertable into the meat tissue of a carcass, conduit means interconnecting the storage tanks and the needles, a source of supply of meat treatment material solvent connected to the conduit means ahead of the first tank, first flow meter means connected to the conduit means between the first and second tanks and having a rotatable cam responsive to units of flow of diluted mixture through the meter and having a cam-actuated pump-controller, metering pump means connected to the conduit means between the first tank and the first flow meter for meter-pumping into a preset quantity of solvent flowing through the first flow meter a fixed percentage of concentrated solution to provide units of diluted mixture, adjustable mixture-unit accumulator means connected with the first flow meter for counting units of flow of diluted mixture through said first flow meter, means including said pump-controller for controlling operation of the pump means responsive to a predetermined condition of adjustment of said accumulator means; second flow meter means connected with the conduit means between the second tank and the needles for accumulating counts of units of diluted mixture flowing from the second pressurized tank to the needles, said second flow meter means including manually settable means measuring the flow of a preset number of units of diluted mixture, and a shut-off valve in the conduit means between the second flow meter means and the needles connected to the manually settable means and responsive to a predetermined setting of said settable means to close said shut-off valve.

References Cited by the Examiner

UNITED STATES PATENTS

| | | | |
|---|---|---|---|
| Re. 23,830 | 5/1954 | Mojonnier | 222—70 |
| 2,024,480 | 12/1935 | Short | 137—101.19 |
| 2,565,084 | 8/1951 | Parks | 222—70 |
| 2,663,247 | 12/1953 | Hensgen et al. | 99—256 |
| 2,688,556 | 9/1954 | Komarik et al. | 99—159 |
| 2,796,017 | 6/1957 | Schmidt | 99—256 |
| 2,821,901 | 2/1958 | Abrams | 99—257 |
| 2,854,342 | 9/1958 | Komarik | 99—159 |

CHARLES A. WILLMUTH, *Primary Examiner.*

H. LORD, WILLIAM B. PENN, *Examiners.*